Oct. 31, 1967   H. L. ZIGLER   3,349,530
ADJUSTABLE TRIM CLIP
Filed March 29, 1965
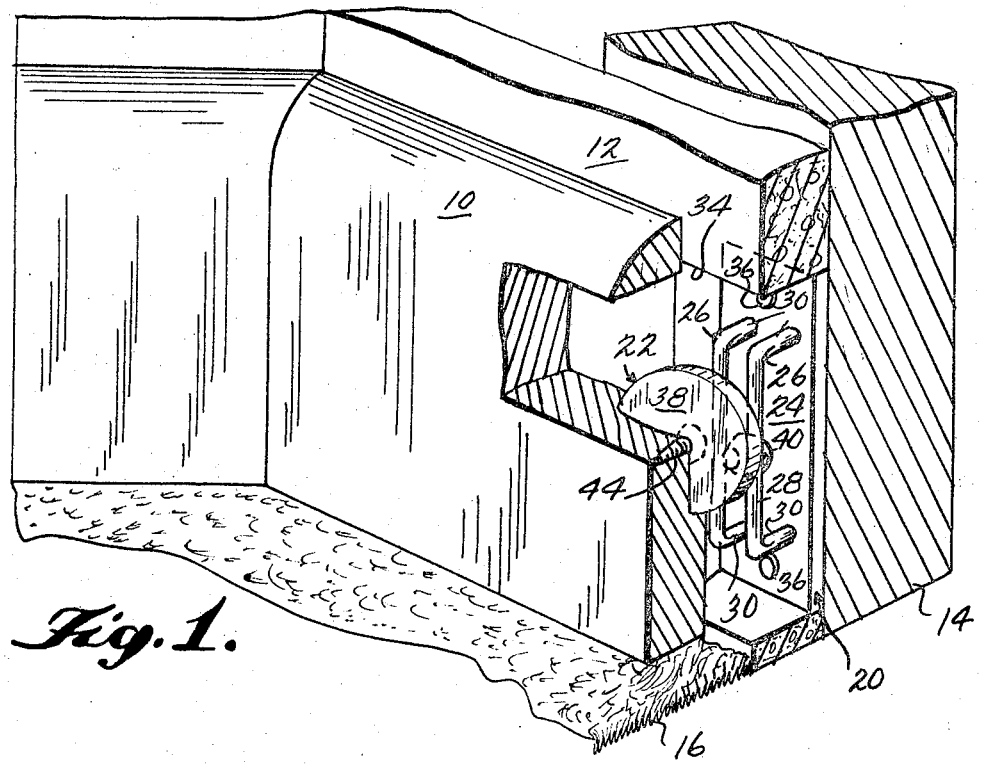
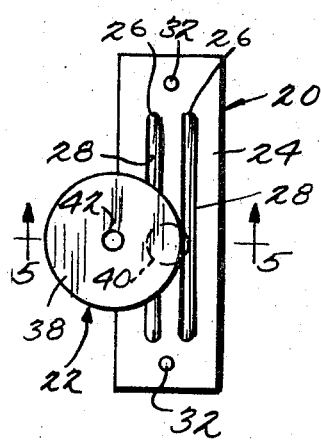
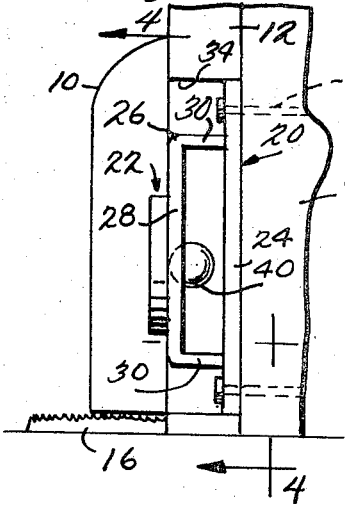
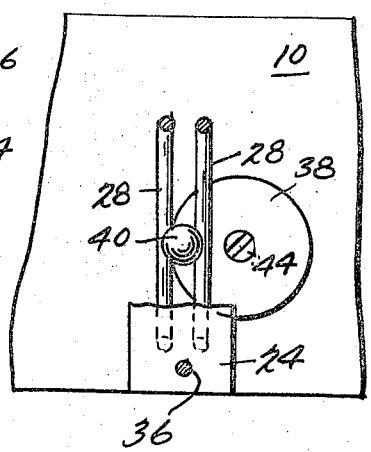
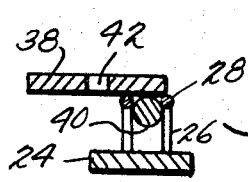
INVENTOR
HERBERT L. ZIGLER
BY Cushman, Darby & Cushman
ATTORNEYS

United States Patent Office 3,349,530
Patented Oct. 31, 1967

3,349,530
ADJUSTABLE TRIM CLIP
Herbert L. Zigler, R.D. 5E, Buck Road,
Alliance, Ohio 44602
Filed Mar. 29, 1965, Ser. No. 443,469
5 Claims. (Cl. 52—288)

ABSTRACT OF THE DISCLOSURE

A molding strip or the like is releasably fastened to a wall by a friction fastener which permits adjustment of the strip relative to the wall in both longitudinal and transverse directions. The fastener comprises a stud portion carried by the strip and frictionally slideably engaged in a vertically elongated socket carried by the wall. The stud portion includes a plate mounted on the strip with a single screw and rotatable about the screw to effect adjustment of the stud.

Disclosure

This invention relates to removable baseboard moldings and the like and in particular to an adjustable fastener or clip for releasably attaching the molding to the wall.

During the redecorating of rooms the presence of moldings, such as baseboard molding, window trim, door trim and paneling, often creates problems which could be overcome if the moldings were easily removable. For example, great care must be taken to avoid the overlapping of paint strokes when the wall and moldings are painted in different colors. The cleaning and refinishing of floors and the replacing and laying of carpet are all rendered more difficult by the presence of moldings and, in addition, the moldings are often scarred during these operations. These disadvantages are present in any redecorating operation and are particularly in evidence where frequent redecorating is required, as in apartments, hotels and motels.

It is the primary object of the present invention to provide a clip or fastener arrangement of improved construction which securely holds moldings, such as baseboard molding, window trim, door trim and paneling in place and which permits the moldings to be readily removed and reinstalled.

It is a more specific object to provide a fastener arrangement of the above type which permits adjustment of the molding strip both longitudinally and transversely of itself. One advantage of this feature is that the moldings can be adjusted to compensate for seasonal dimensional changes and permanent dimensional changes occurring with settling of the building. Another and more important advantage is that baseboard molding can be adjusted vertically either to lie flush with the floor or to rest on top of carpeting of different thicknesses.

It is a still more specific object to provide a two-part, snap friction fastener for adjustably and removably attaching a molding strip or the like to a surface, the fastener comprising a male and a female part one of which in its operative position is elongated in a first direction to permit sliding adjustment between the parts while coupled together and one of which is adjustable, with respect to the article to which it is attached, in a second direction, at a right angle to the first direction. In a preferred embodiment the female part of the fastener comprises a pair of parallel, elongated resilient legs extending in the first direction, and the male element comprises a disc having a stud-like projection which snaps into the slot between the legs. The disc is mounted for rotation so as to adjust the position of the stud-like element in the second direction.

These and other objects will be understood from the following detailed description in conjunction with the drawings in which:

FIGURE 1 is a perspective view, partly broken away, of a wall and baseboard molding provided with a fastener constructed according to the principles of the present invention;

FIGURE 2 is a front view of the fastener of FIGURE 1;

FIGURE 3 is a side elevational view of the fastener of FIGURE 1 illustrating the relative points of attachment of the parts of the fastener;

FIGURE 4 is a sectional view taken on the line 4—4 of FIGURE 3; and

FIGURE 5 is a sectional view taken on the line 5—5 of FIGURE 2.

Referring to FIGURE 1 there is shown in simplified form a strip of baseboard molding 10 releasably attached to a plaster wall 12, the latter being supported by spaced studs one of which is shown at 14. The edge of a piece of wall-to-wall carpeting 16 is shown extending under the molding 10 so as to be held flat against the floor. The molding 10 is releasably and adjustably attached to the wall 12 by means of a two-part snap friction fastener which comprises a female portion 20 attached to the wall 12 and a male portion 22 attached to the rear surface of the molding strip 10. The female portion 20 yieldingly retains the male portion 22 in a variety of different vertical positions so that the molding 10 can be vertically adjusted and pried from the wall 12 and reinstalled as desired. Horizontal adjustment of the mold 10 is obtained by loosening the male portion 22 and rotating it through an arc, as will be described in detail hereinafter.

The female portion 20 of the fastener is constructed of a flat, rectangular mounting plate 24 and a pair of spaced apart legs 26 projecting from one surface of the plate 24. Each leg 26 is formed of a length of heavy gage steel wire spring, or other stiff but resilient material having a long straight clamping portion 28 extending parallel to and longitudinally of the plate 24. A bent portion 30 at each end of the clamping portions 28 is secured to the mounting plate 24 thereby holding the clamping portions 28 in spaced relationship to the plate 24. A hole 32 is provided at each end of the plate 24 to receive a nail or screw.

As seen in FIGURES 1 and 3, the female portion 20 of the fastener is disposed in a recess 34 in the wall 12 in a position such that the clamping portions 28 of the legs 26 extend vertically in substantially the same plane as the outer surface of the wall 12. In the embodiment shown, the dimension of the female portion 20 in a direction at a right angle to the wall 12 is the same as the depth of the recess 34 so that the desired position of the female portion 20 is obtained by fastening its mounting plate 24 directly to the stud 14, as with nails 36. It is not necessary, however, that the clamping portions 28 of the legs lie in the plane of the outer surface of the wall 12. They may be disposed on either side of the plane so long as the two halves of the fastener are in clamped engagement when the molding 10 is flat against the wall 12.

The male portion 22 of the fastener, in the illustrated embodiment, consists of a circular metal disc 38 and stud-like element form of a small metal ball 40 which is fixedly secured, as by welding, to one side of the disc 38 at the edge thereof. The diameter of the ball 40 is slightly greater than the width of the slot between the legs 26 of the female portion 20.

While the ball 40 is shown tangent to the disc 38, it may be spaced slightly therefrom by a short stem provided that the thickness of the legs 26 is sufficient to assure a tight engagement of the two parts of the fastener. The engagement of the cooperating elements is best illustrated in FIGURE 5 wherein it is seen that play between the parts is prevented by virtue of the clamping portions 28 of the legs 26 being held between the surface of the disc 38 and the ball 40. It will be apparent that shapes other than a ball may be employed for the male element, such as a cylindrical pin having a circumferential groove near to outer end for receiving the clamping portions of the legs.

The disc 38 is set into a circular recess in the back of the molding 10, the depth of the recess being the same as the thickness of the disc 38. The surface of the disc 38 to which the ball 40 is attached therefor lies in the plane of the outer surface of the wall 12, as seen in FIG. 3, although this relationship is not critical. The important relationship, as indicated before, is that the fastener be in its latched position when the molding 10 is against the wall 12. A central hole 42 is provided in the disc for receiving a screw 44 which detachably secures the disc 38 to the molding 10. The screw 44 is normally screwed in tightly, but it may be loosened to permit rotational adjustment of the disc 38. If desired, more than one disc and ball unit may be attached one above the other for cooperation with a single female portion 20.

In operation, after the halves 20, 22 of the fastener have been attached one to the molding 10 and the other to the wall 12, the molding 10 is placed against the wall 12 with the ball 40 resting against the legs 26. While only one fastener has been illustrated, it will be understood that a plurality of fasteners will be provided in spaced relationship along the length of the molding 10. The molding 10 is then pushed toward the wall 12 so as to force the ball 40 into a clamped position in the slot between the legs 26. As the ball 40 presses against the clamping portions 28 of the legs 26, the latter are spread apart and begin to receive the ball 40 between them. When the center of the ball 40 passes the midlines of the clamping portions 28, the legs 26 tend to spring back to their normal position and thus tend to force the ball 40 completely through the space between the clamping portions 28. This movement continues until the disc 38 engages the clamping portions 28 at which time the ball 40 and disc 38 become tightly clamped, as seen in FIGURE 5.

It will be apparent that if play between the halves 20, 22 of the clip is to be avoided, the dimensions of the parts involved must be such that the ball 40 is still being forced toward the wall 12 by the spring action of the legs 26 when the molding 10 engages the wall 12. In the embodiment illustrated the disc 38 engages the legs 26 at the same time that the molding 10 engages the wall 12, but this relationship is not essential. For example, if the female portion 20 of the clip is recessed relatively deeply within the wall 12, the ball 40 may be mounted on a relatively long stem with the result that the legs 26 do not engage the disc 38 in the clamped portion of the clip. However, the engagement of the legs 26 with both the ball 40 and the disc 38, as shown in FIGURE 5, is a preferred construction because it permits the tolerances of the cooperating elements to be somewhat less strict. Removal of the molding 10 is accomplished merely by prying it away from the wall with a screw driver or other suitable tool.

It is apparent that vertical adjustment of the molding 10 may be obtained merely by manually sliding the molding 10 up or down after the two halves 20, 22 of the fastener have become clamped together. During movement of the molding 10 the ball 40 slides up or down between the clamping portions 28. The molding 10 will remain in whatever vertical position it is placed as a result of the force of the fastener which tends to pull the molding 10 into engagement with the wall 12.

Adjustment of the molding 10 in a horizontal direction along its length is obtained by changing the rotational position of disc 38. This is done by removing the molding 10 from the wall 12, loosening the screw 44, rotating the disc 38 through an arc and re-tightening the screw 44. Rotation of the disc 38 moves the ball 40 in a circular path, the component of movement along the axis of the molding 10 determining the amount of horizontal adjustment which will be obtained when the molding 10 is replaced on the wall 12. The change in the vertical position of the ball 40 which accompanies the rotation of the disc 38 is of no consequence, because it can be compensated for by the vertical adjustment permitted by the legs 26. To absorb the vertical component accompanying the maximum amount of horizontal adjustment, the legs 26 must be as long as one-half the diameter of the disc 38, but as a matter of practice they will be constructed somewhat longer so as to permit a greater range of adjustment.

It will be apparent that the male and female elements of the fastener and the directions of adjustment may be reversed without departing from the scope of the invention. That is, the female portion 20 may be attached to the molding and the male portion to the wall, and the female portion 20 may be elongated along the axis of the molding 10 rather than transversely thereof. Further, the shape of the male and female elements and the manner of adjusting their relative positions may be varied from that illustrated without departing from the spirit of the invention.

It will thus be seen that the present invention provides a simple and economical fastener which permits easy removal, replacement and adjustment of all types of moldings and interior trim. Painting, papering, floor refinishing, carpet laying and other redecorating operations are thereby rendered easier and quicker, because baseboard moldings and the trim around windows and doors can be readily removed prior to beginning work and subsequently replaced. It will be appreciated, however, that the fastener is not limited to wall and molding combinations and may be employed in other arrangements where an adjustable friction fastener is useful. It will be appreciated also that the fastener is not limited to linear adjustment of its parts inasmuch as the slot defined by the female portion may be curved either in or transverse to the plane of the molding strip. Accordingly, in the appended claims, the words "parallel" and "axis" are indented to encompass both linear and arcuate relationships.

What is claimed is:

1. In combination with a wall and a molding lying flush against the wall, a plurality of two part snap friction fasteners for releasably attaching the molding to the wall and for effecting adjustment of the molding relative to the wall in both longitudinal and transverse directions, said fasteners being longitudinally spaced apart along the length of the molding between one surface of the molding and the opposed surface of the wall, each of said fasteners comprising two separate parts one of which is secured to the wall and one of which is secured to the molding, said parts being frictionally and releasably engaged with each other, one of said parts defining an elongated slot extending in one of said directions and having stiff but resilient sides, the other of said parts including a stud-like element having an enlarged outer end disposed in said slot for sliding movement therealong and frictionally engaged with said stiff, resilient sides, said other part including mounting means providing for adjustment of said stud-like element in the other of said directions whereby the molding may be adjusted longitudinally and transversely of itself relative to the wall by changing the position of said stud-like element and by sliding said stud-like element along said slot.

2. The combination of claim 1 wherein said other part of each fastener includes a rigid plate having one surface in engagement with the respective wall or molding and an opposite surface to which said stud-like element is fixedly secured and wherein said mounting means adjustably secures said plate to the respective wall or molding for movement in said other direction.

3. The combination of claim 2 wherein said mounting means includes a fastener extending through a complementary aperture in said rigid plate into the material of the respective wall or molding and clamping said plate in position, said plate being rotatable about the axis of said aperture when said fastener is loosened whereby movement of said plate through an arc effects a component of movement of said stud-like element in said other direction.

4. An adjustable friction fastener for releasably attaching one structure to another and for effecting adjustment of one part relative to the other part, said fastener comprising: a first part which includes a rigid mounting plate and a pair of stiff but resilient legs secured to one surface of said plate and having elongated parallel clamping portions intermediate their ends and defining a slot between them, said clamping portions being parallel to and spaced from said one surface of said plate; a second part including a stud-like element projecting from one surface of a second mounting plate, the free end of said element being frictionally engageable with said clamping portions of said legs when inserted in said slot and being slideable along said slot so as to effect relative adjustment between said first and second parts in the direction of said slot, said second mounting plate having a single mounting aperture therethrough at a location laterally spaced from said stud-like element; and a rigid fastening element extending through said aperture for clamping said other surface of said second mounting plate to a surface of one of the structures, said second mounting plate being rotatable about said fastening element so as to effect relative adjustment between said first and second parts in another direction, the clamping portions of said legs are defined by stiff wire-like elements which are clamped between the surface of said second mounting plate and adjacent surfaces of said stud-like element when the latter is in its operative position in the slot defined by said clamping portions.

5. A fastener as in claim 4 wherein said stud-like element is a ball fixed directly to said second mounting plate.

References Cited

UNITED STATES PATENTS

| | | | |
|---|---|---|---|
| 665,901 | 1/1901 | Hampton | 24—217 |
| 955,100 | 4/1910 | Peterson | 24—217 |
| 1,433,788 | 10/1922 | Carr | 24—216 |
| 2,093,174 | 9/1937 | Pololsky | 24—217 X |
| 2,151,284 | 3/1939 | Tinnerman | 24—217 X |
| 2,943,373 | 7/1960 | Rapata | 24—216 |

FOREIGN PATENTS 77,111  1918  Switzerland.

JOHN E. MURTAGH, *Primary Examiner.*